United States Patent
Yoshiyuki et al.

[11] Patent Number: 5,105,491
[45] Date of Patent: Apr. 21, 1992

[54] SEAT CUSHION COMPRISED OF FOAM LAYERS

[75] Inventors: Matsuoka Yoshiyuki, Yokohama; Yamazaki Shinichi, Kanagawa; Takagi Genjiro, Tokyo, all of Japan

[73] Assignees: Toyo Tire & Rubber Co., Ltd., Osaka; Nissan Motor Co., Ltd., Yokohama; Tachi-S Co., Ltd., Tokyo, all of Japan

[21] Appl. No.: 759,726

[22] Filed: Sep. 11, 1991

Related U.S. Application Data

[63] Continuation of Ser. No. 394,139, Aug. 15, 1989, abandoned.

[30] Foreign Application Priority Data

Aug. 16, 1988 [JP] Japan ................................ 63-203342

[51] Int. Cl.⁵ .......................... A47C 27/15; A47C 7/18
[52] U.S. Cl. .................................. 5/481; 297/DIG. 1
[58] Field of Search ........................ 5/481, 464, 465; 297/DIG. 1, 452

[56] References Cited

U.S. PATENT DOCUMENTS

| | | | |
|---|---|---|---|
| 3,161,436 | 12/1964 | Hood | 5/481 |
| 3,612,607 | 10/1971 | Lohr | 297/DIG. 1 |
| 3,751,111 | 8/1973 | Taylor | 297/DIG. 1 |
| 3,833,260 | 9/1974 | Harder | 297/DIG. 1 |
| 4,190,697 | 2/1980 | Ahrens | 5/481 |
| 4,405,681 | 9/1983 | McEvoy | 5/481 |
| 4,432,110 | 2/1984 | Sutton | 5/481 |
| 4,541,885 | 9/1985 | Caudill | 5/481 |
| 4,606,580 | 8/1986 | Yoshizawa | 297/DIG. 1 |
| 4,747,638 | 5/1988 | Saito | 297/DIG. 1 |

FOREIGN PATENT DOCUMENTS 2715027 10/1977 Fed. Rep. of Germany ... 297/DIG. 1

*Primary Examiner*—Renee S. Luebke
*Assistant Examiner*—F. Saether
*Attorney, Agent, or Firm*—Koda and Androlia

[57] ABSTRACT

A seat cushion comprising an upper foamed layer of low impact resilience having a ratio of not higher than 25% which exhibits high hysteresis loss and at least one foamed layer supporting said upper layer of higher impact resilience as well as a method for producing the same.

2 Claims, 1 Drawing Sheet

SEAT CUSHION COMPRISED OF FOAM LAYERS

This is a continuation of application Ser. No. 394,139, filed Aug. 15, 1989, now abandoned.

BACKGROUND OF THE INVENTION

1. Field of the Invention

This invention relates to a seat cushion and more particularly to a seat cushion having improved compression properties and also relates to a method for producing the same.

2. Prior Art:

Conventionally, there has been used a seat cushion in which an upper layer to be in contact with a seat occupant has a impact resilience of higher than 30% which is inferior in load dispersing properties, and as a result uncomfortable seating was experienced when rolling an the seat conditions. Such a seat cushion impresses a person, especially an overweight person, cramped at both sides and tends to give a local high pressure, and consequently fatigable seating conditions were induced.

SUMMARY OF THE INVENTION

It is therefore an object of the present invention to provide a seat cushion which exerts superior load dispersing properties and comfortable seating even under rolling seating conditions.

In order to accomplish the above object, the present invention develops such a novel construction that an upper foamed layer to be in contact with a seat occupant is composed of a foamed body having low impact resilience in order to exert damping capacity due to hysteresis loss while investigations and developments were conventionally directed to the control of density and rigidity of a foamed body.

Namely a seat cushion in accordance with the present invention comprises an upper foamed layer of low impact resilience whose ratio is not higher than 25% which exhibits high hysteresis loss and a lower foamed layer, for supporting the upper foamed layer, of high impact resilience whose ratio is not lower than 55% which exhibits high rebound.

In accordance with the present invention, an intermediate foamed layer of moderate impact resilience whose ratio is 40–50% may be interposed between the upper foamed layer and the lower foamed layer. In this case, the upper layer is supported by both the intermediate layer and the lower layer.

A method for producing such a seat cushion comprises pouring and expanding foramable liquid compounds in a mold cavity successively in turn from an upper layer to a lower layer for forming integrally laminated foamed layers. Namely, for producing a two-layer seat cushion comprising an upper foamed layer of low impact resilience having a ratio of not higher than 25% and a lower foamed layer of high impact resislience having a ratio of not lower than 55%, a foamable liquid compound for said upper foamed layer is first poured and expanded in a mold cavity and then a foamable liquid compound for said lower foamed layer is successively poured in said mold cavity and expanded, whereby integrally laminated foamed structure of two layers are formed.

A three-layer seat cushion comprising an upper foamed layer of low impact resilience having a ratio of not higher than 25%, an intermediate foamed layer of moderate impact resilience having a ratio of 40–50% and a lower foamed layer of high impact resilience having a ratio of not lower than 55% is also produced in the same manner. Namely, a method for producing said three-layer seat cushion comprises pouring and expanding foamable liquid compounds in a mold cavity successively in turn from an upper layer to a lower layer for forming integrally laminated foamed layers. More precisely, a foamable liquid compound for said upper foamed layer is first poured and expanded in a mold cavity and then a foamable liquid compound for said intermediate foamed layer is successively poured in said mold cavity and expanded and finally a foamable liquid compound for said lower foamed layer is successively poured in said mold cavity and expanded, whereby integrally laminated foamed structure of three layers are formed.

It is preferable to use a plurality of upper molds to construct successively in turn a mold cavity for each of foamable liquid compounds and to use soft type polyurethane foamable liquid compounds.

The seat cushion provided in accordance with the present invention thus comprises an upper foamed layer of low impact resilience having a ratio of not higher than 25% which exhibits high hysteresis loss and a foamed layer supporting said upper layer of higher impact resilience, whereby said seat cushion fits any physiques and any postures of seat occupants without giving an impression of excessive pressure. Comfortable soft seating conditions are then attained even under rolling seating conditions. The lower foamed layer for supporting the upper foamed layer being composed of a foamed layer of higher impact resilience, good supporting and rebounding properties are attained. Synergistic actions derived from the laminated structure of the foamed layers having low impact resilience and higher impact resilience afford comfortable seating for a long period of time.

DETAILED DESCRIPTION OF THE INVENTION

Figure 1:
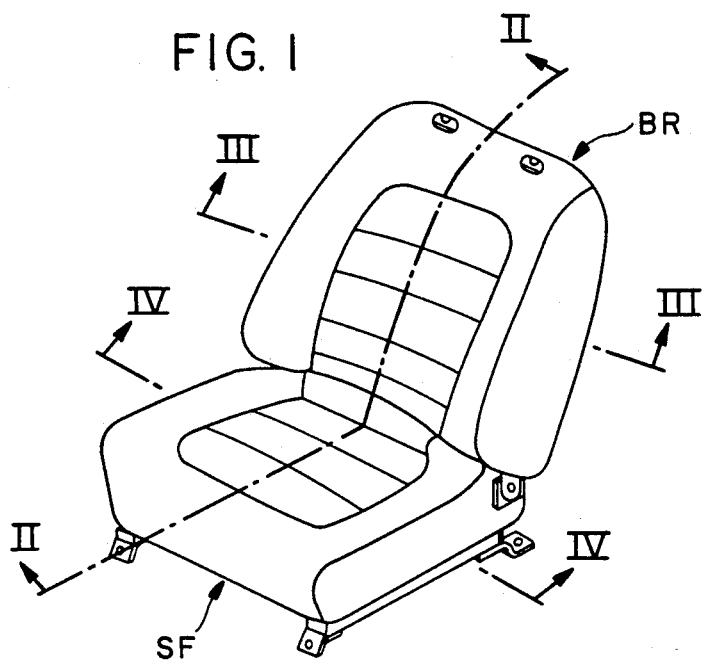
FIG. 1 represents a perspective view showing one embodiment of a seat cushion in accordance with the present invention.
Figure 3:
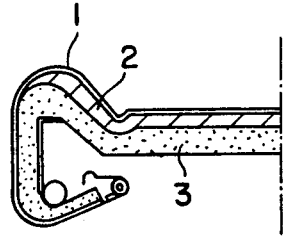
FIG. 3 represents a partial sectional view taken along III—III line in FIG. 1.
Figure 4:
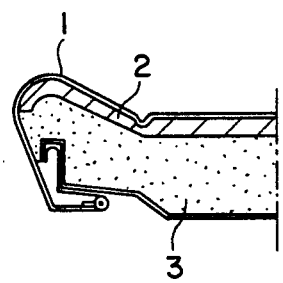
FIG. 4 represents a partial sectional view taken along IV—IV line in FIG. 1.
Figure 2:
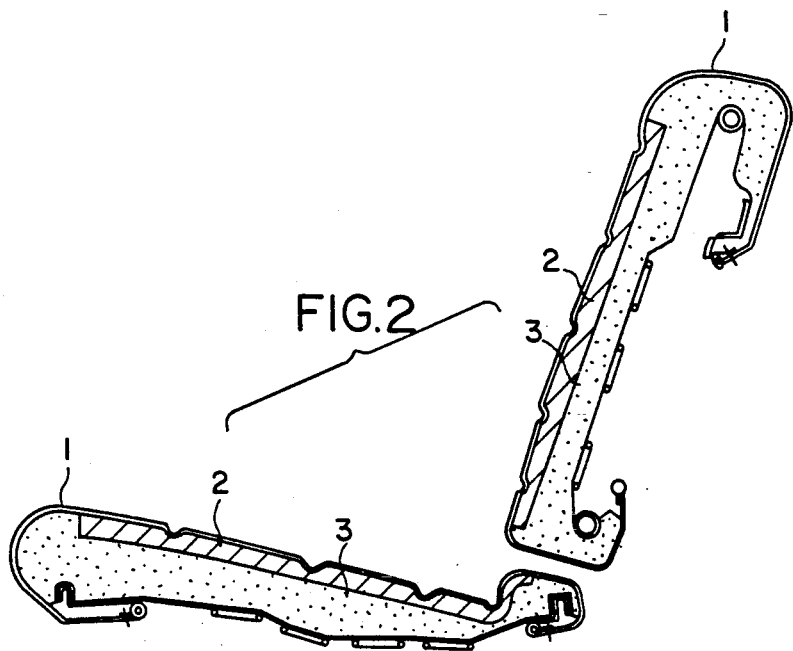
FIG. 2 represents a sectional view taken along II—II line in FIG. 1.

In the drawings, reference sign SF indicates a seat portion and BR indicates a back rest portion of a seat cushion. Reference numeral 1 indicates a skin; 2 indicates an upper foamed layer of low impact resilience having a ratio of not higher than 25%; and 3 indicates a lower foamed layer of high impact resislience having a ratio of not lower than 15%.

The seat portion SF and the back rest portion BR are manufactured respectively using a respective mold in such a manner that a foamable liquid compound for the upper foamed layer 2 of low impact resilience is first poured and expanded in a mold cavity and then a foamable liquid compound for the lower foamed layer 3 of high impact resilience is successively poured onto said first foamed upper layer and expanded so as to form an integrally laminated foamed structure of the upper and lower foamed layers.

Shown in the following Table 1 are the embodiments A, B, C and D of foamable liquid compounds for and the physical properties of the upper foamed layer.

TABLE 1

|  | A | B | C | D |
|---|---|---|---|---|
| Ingredients (p.b.w.) | | | | |
| POLYOL X | 90 | 90 | 90 | 90 |
| HARDMASTER 17 | 10 | 10 | 10 | 10 |
| Water | 2 | 2 | 2 | 2 |
| DABCO 33LV | 0.7 | 0.7 | 0.7 | 0.7 |
| silicone | 2.5 | 2.5 | 2.5 | 2.5 |
| TDI-80/20 | 36.6 | 41.2 | 45.8 | 50.3 |
| TDI-INDEX | 80 | 90 | 100 | 110 |
| Physical properties | | | | |
| apparent density (kg/m$^3$) | | | | |
| total density | 62 | 58 | 56 | 55 |
| core density | 58 | 54 | 50 | 50 |
| impact resilience (%) | | | | |
| skin-covered | 6 | 8 | 11 | 15 |
| core | 8 | 10 | 12 | 15 |
| 25% rigidity (kg/200 mm$\phi$) | 8 | 13 | 22 | 34 |
| hysteresis loss (%) | 39 | 53 | 62 | 70 |
| tear strength (kg/cm) | 0.40 | 0.58 | 0.80 | 0.95 |
| tensile strength (kg/cm$^2$) | 2.02 | 1.59 | 1.15 | 0.61 |
| elongation (%) | 65 | 79 | 98 | 98 |

(NOTE)
POLYOL X: polyester polyolhel No. H-9021 of Dai-ichi Kogyo Seiyaku Co., Ltd.
HARDMASTER 17: crosslinker of Dai-ichi Kogyo Seiyaku Co., Ltd.
DABCO 33LV: amine catalyst of Sankyo Air product Co., Ltd.
TDI-80/20: tolylene diisocyanate-2,4-/2,6- = 80/20

By variation of the quanity of HARDMASTER 17 or water, the rigidity can be modified, for example, in the range of 6 kg/200 mm$\phi$ to 60 kg/200 mm$\phi$.

The physical properties such as apparent density, impact resilience and rigidity as described were determined in conformity with JIS K6401-1980. The total density in the apparent density(kg/m$^3$) was determined by using skin-covered test pieces of 350 mm×350 mm×100 mm and the core density was determined by using test pieces of 100 mm×100 mm×50 mm which were obtained by cutting the test pieces of 350 mm×350 mm×100 mm. The same is the cases when measurements of the impact resiliences of skin-covered test pieces and test pieces of cores were made.

Shown in the following Table 2 is an embodiment of the foamable liquid compounds for and the physical properties of the lower foamed layer.

TABLE 2

| Ingredients (p.b.w.) | |
|---|---|
| EP-3033 | 60 |
| POP-31-28 | 40 |
| silicone surfactant | 1.0 |
| Water | 2.5 |
| DABCO 33LV | 0.5 |
| diethanolamine | 1.5 |
| TDI (80/20)-INDEX | 115 |
| Physical properties | |
| apparent density (kg/cm$^3$) (total density) | 50–65 |
| impact resilience (%) | 55–60 |
| 25% rigidity (kg/200 mm$\phi$) | 16–25 |
| hysteresis loss (%) | 25 |

(NOTE)
EP-3033: polypropylene glycol (ppg) of MITSUITOATSU
POP-31-28: 20% acrylonitrile graft PPG of MITSUITOATSU

We claim:

1. A seat cushion comprising an integrally laminated foam structure of an upper foam layer of low impact resilience and a lower foamed layer of high impact resilience for supporting the upper foamed layer, said upper foamed layer and lower foamed layer having an apparent total density substantially the same, said impact resilience of the upper foamed layer being equal to or less than 25% and said impact resilience of the lower foamed layer being not less than 55%.

2. A seat cushion according to claim 1, wherein said total apparent density of the upper foamed layer is in the range of 55–62 kg/m$^3$ and the apparent total density of the lower foamed layer is in the range of 50–65 kg/m$^3$.

* * * * *